United States Patent [19]

Ballreich et al.

[11] 4,140,058
[45] Feb. 20, 1979

[54] CARTRIDGE CASES AND PROCESS FOR THE PRODUCTION THEREOF

[75] Inventors: Kurt Ballreich, Nüremberg; Hans Umbach, Fürth, Jürgen Ashlborn, Egersdorf; Wolfgang Reuter, Fürth, all of Fed. Rep. of Germany

[73] Assignee: Dynamit Nobel Aktiengesellschaft, Fed. Rep. of Germany

[21] Appl. No.: 715,506

[22] Filed: Aug. 18, 1976

[30] Foreign Application Priority Data

Sep. 12, 1975 [DE] Fed. Rep. of Germany ....... 2540721
Jan. 31, 1976 [DE] Fed. Rep. of Germany ....... 2603710

[51] Int. Cl.² .............................................. F42B 5/30
[52] U.S. Cl. ................................... 102/43 P; 156/73.1
[58] Field of Search ...................... 102/42 R, 43 P, 44; 156/73.1

[56] References Cited

U.S. PATENT DOCUMENTS

| 3,093,073 | 6/1963 | Lockwood et al. | 102/43 P |
| 3,424,089 | 1/1969 | Humpherson | 102/43 P |
| 3,602,257 | 8/1971 | Berleyoung et al. | 156/73.1 |
| 3,824,138 | 7/1974 | Karobath et al. | 156/73.1 |

FOREIGN PATENT DOCUMENTS

| 1146646 | 5/1957 | France | 102/43 P |
| 1325407 | 3/1963 | France | 102/43 |

OTHER PUBLICATIONS

Branson publication, *How to Get Good Ultrasonic Welds*, Reprinted from Nov. 1964 issue of Modern Plastics (6 pages).

*Primary Examiner*—Verlin R. Pendegrass
*Attorney, Agent, or Firm*—Craig & Antonelli

[57] ABSTRACT

A cartridge case and a process for the production thereof wherein the cartridge case includes an elongated tubular member and a separate bottom part. The separate bottom part is insertable in said elongated tubular member such that at least a portion of the wall surfaces of said bottom part and said tubular member contact one another and at least one of said separate bottom part and said elongated tubular member in the region of the wall surfaces to be contacted is provided with transfer elements. The transfer element means are responsive to ultrasonic energy for joining said bottom part and said elongated tubular member together such that a cartridge case is formed especially utilizable as a shot cartridge case.

30 Claims, 8 Drawing Figures

CARTRIDGE CASES AND PROCESS FOR THE PRODUCTION THEREOF

The present invention relates to cartridge cases and a process for the production thereof.

It is known from DAS [German Published Application] No. 1,479,541 to manufacture cartridge cases from a synthetic resin by the injection molding method, wherein the case and the bottom part are initially formed integrally with each other. Furthermore, bipartite cartridge cases are known from DAS No. 1,453,845, wherein the case and the bottom part are produced separately. The two parts are joined, for example, by injection-molding the bottom part directly into the previously manufactured case or by welding the bottom part, produced by the injection-molding method, to the case made of a biaxially stretched tube with the use of a solvent or with the supply of heat from the outside. A disadvantage in these conventional manufacturing methods is that the production costs are undesirably high and/or that the strength and gastightness of the bond between the case and the bottom part are unsatisfactory or the strength and shape of the case are undesirably altered by the joining to the bottom part.

It is therefore an object of the present invention to provide cartridge case parts and a process for the production of cartridge cases which overcome the aforementioned disadvantages of the prior art.

It is another object of the present invention to provide cartridge case parts and a process for the production of cartridge cases wherein a case and a separate bottom part are joined together so that a flawlessly tight and firm bond is established between the case and the bottom part with a minimum of manufacturing costs, without disadvantageously altering the properties of the case or the bottom part.

According to a feature of the present invention, a case and bottom part are separately produced with at least one of the case and bottom part being provided with axially and/or peripherally arranged transfer elements at the contacting surfaces of the case and bottom part. The transfer elements which are preferably formed at the bottom part, but which can basically also be formed on the inner surface of the case or also on both components make it possible in an advantageous manner to achieve a controlled melting process in the bonding zone between the case and the bottom part under the effect of mechanical oscillatations of, for example, 20 kHz. during an ultrasonic welding step. During the ultrasonic welding, the transfer elements become molten and run between the inner wall surface of the case and the outer wall surface of the bottom part, whereby the welding of these components is achieved. In this ultrasonic welding procedure, the heating of the case is so minor that even if the case is manufactured, as is preferred, from a biaxially stretched tube, there occurs no deformation or restoration and no reductions in strength due to the welding step. The welding process of this invention moreover produces, with a comparably lower manufacturing expenditure, a flawlessly firm and gastight bond between the case and the bottom part without the necessity for an additional external metallic bottom cap.

In accordance with another feature of the present invention the mechanical ultrasonic oscillations, which are preferably longitudinal oscillations, are transmitted to the components to be joined by welding preferably by a so-called "Sonotrode" welding device. The "Sonotrode" can basically be pressed radially from the outside against the outer surface of the case extending over the bottom part. Under these circumstances at least two mutually movable "sonotrodes" should be provided to prevent the ultrasonic treatment from becoming too nonuniform. In accordance with the process of the present invention, however, the oscillations are preferably transmitted into the case via the rear end face of the bottom part inserted in the case, whereby a very uniform ultrasonic treatment of the bottom part is attained along with a relatively low expenditure for conducting the process and for the associated welding device.

The bonding surface between the case and the bottom part is advantageously at least substantially cylindrical, i.e. it is formed to extend in the axial direction. As has been found, the welding step in the zone of the transfer elements takes place particularly advantageously if bottom parts are utilized which exhibit an indentation emanating from their front end, the wall of which — as seen from the rear end face of the bottom part — is inclined toward the outside. The wall is preferably formed essentially as a conical surface, but it could also be, for example, in the form of a spherical shell or curved in some other way in two planes, if this should provide advantageous in a particular case. Thereby, a favorable transmission of the oscillations introduced by way of the rear end face of the bottom part to the welding surface, which is practically at right angles thereto, is achieved.

To conduct the process of the present invention, the cartridge case is constructed such that the bottom part and/or case are provided before being welded together with web-like, rib-shaped, or the like transfer elements in the region of the wall surfaces in contact with each other in the welded condition. The bottom part is made of a synthetic resin, at least in its outer zone to be welded together with the case, but preferably in its entirety. The number, dimensions, i.e. width, radial height, and length, and the configuration of the transfer elements are determined in correspondence with the requirements of the individual case, inter alia, so that there is sufficient welding material available, on the one hand, and undesirably large flow paths in the bonding zone are avoided, and so that, on the other hand, a favorable conversion of the mechanical oscillatory energy into heat energy is attained to avoid an energy supply which is too vigorous and too long-term, with a correspondingly undesired heating of the parts to be welded together. The outer diameter of the preferably cylindrical wall surface of the bottom part and the inner diameter of the case are adapted to each other so that the case even after the melting of the transfer elements, which originally project radially from the outer surface or surfaces, is pressed sufficiently firmly against the bottom part to ensure the contact pressure required for the welding step.

In an advantageous arrangement of the present invention, the provision is made to fashion the transfer elements on the bottom part in the peripheral direction. This arrangement proves to be advantageous with respect to the gastightness in the welding zone. Favorable along the same lines is also the configuration of the bottom part wherein the front rim is constructed as a transfer element.

An advantageous cartridge case manufactured according to the process of the present invention is characterized in that the bottom part and the case are welded together by ultrasonics via web-like, rib-shaped, ridge-type or the like transfer elements, formed at the bottom part and/or at the case in the zone of their contacting wall surfaces. The bottom part here again consists of a synthetic resin at least in its outer zone to be welded together with the case. However, preferably a bottom part is employed which is entirely of synthetic resin. The case has preferably a smooth inner cylindrical wall surface, i.e. a wall surface which is free of projections or indentations. The transfer elements, in this connection, are preferably formed on the outer wall surface of the bottom part to extend in the axial direction and preferably also in the peripheral direction.

The present invention is especially advantageous for shot cartridge cases wherein the case is made from a biaxially stretched tube. The tube is made preferably of low-pressure polyethylene. Also, the bottom part is produced preferably of low-pressure polyethylene, especially by the injection-molding method. For conducting the process of this invention, a low-pressure polyethylene having a density larger than 0.945 g./cm$^3$ and a melt index $I_5$ smaller than 2 g. per 10 minutes proved to be especially suitable. The melt index $I_5$ was determined under a load of 5 kp. and at 190° C.

For the sound transmission, a construction of the cartridge case wherein the bottom part is made from a low-pressure polyethylene having a density higher than that of the case proves to be advantageous.

These and other objects, features and advantages of the present invention will become more apparent from the following description when taken in connection with the accompanying drawings, and wherein.

Figure 1A:
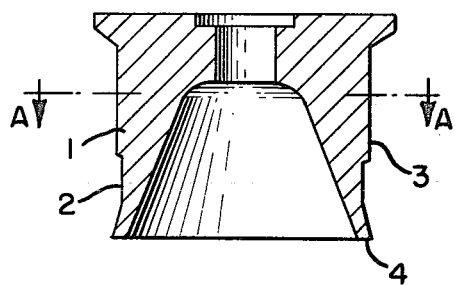
FIGS. 1a and 1b show the bottom part of a cartridge case in a longitudinal section and in cross section, respectively, in accordance with the present invention.

Referring now to the drawings wherein like reference numerals designate like parts throughout the several views, there is shown in FIG. 1a a bottom part 1 of a synthetic resin, e.g. low-pressure polyethylene, which is produced separately by the injection-molding method, for example, and is provided on its outer wall surface 2 with axial transfer elements or protrusions 3 which are constructed as longitudinal ribs having a radial height of about 0.2 mm. The transfer elements 3 which serve for the controlled local transmission of mechanical oscillations and also as welding material extend in this arrangement over about two-thirds of the axial length of the wall surface 2 of the bottom part 1 to be inserted in the case. However, the transfer elements can also be longer or shorter, depending on the circumstances, and they can also be subdivided by corresponding interspaces in the axial direction into two or several series-arranged sections. The forward rim 4 of the bottom part 1 is slightly flared so that it extends — as seen in the radial direction — outwardly past the cylindrical wall surface 2, and thereby acts as an additional transfer element which, in the welded condition, effects an additional firm and tight bond with the case.

Figure 1B:
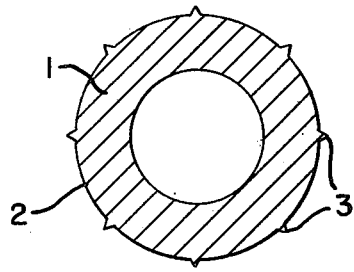

FIG. 1b represents a cross section taken along line A—A in FIG. 1a and shows that the bottom part 1 has eight rib-like transfer elements or protrusions 3 of a triangular cross section on its wall surface 2 in uniform distribution along the circumference. Of course, it is likewise possible to provide a different number of transfer elements, and the cross section thereof can also have a different configuration, e.g. rectangular or semicircular, if this should prove more suitable in an individual instance.

Figure 2:
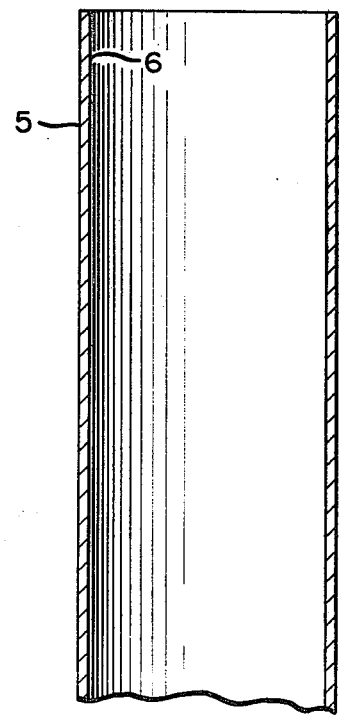
FIG. 2 shows the case of a shot cartridge case.

FIG. 2 shows a portion of a cylindrical case 5 in a longitudinal section, intended for a shot cartridge case and manufactured, for example, of a biaxially stretched low-pressure polyethylene tube. The diameter of the inner cylindrical wall surface 6 thereof is lightly smaller than the outer diameter of the cylindrical wall surface 2 of the bottom part 1, so that the desired radial contact pressure between the case and the bottom part is obtained during the welding step without any additional external auxiliary means. However, it is also possible, for example, with the aid of a contact pressure means to weld the two parts together with identical diameters. Both the case and bottom part may be manufactured from a low-pressure polyethylene having a density larger than 0.945 gm/cm$^3$ and a melt index $I_5$ smaller than 2 g. per 10 minutes, the melt index $I_5$ being determined under a load of 5 kp. and at 190° C. Preferably, the bottom part 1 is made from a low-pressure polyethylene having a density higher than the case 5.

Figure 3:
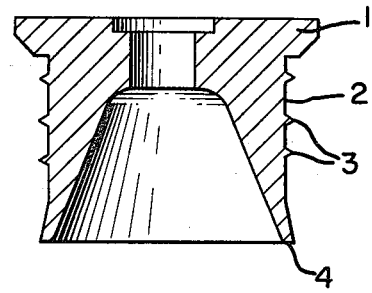
FIG. 3 shows a different arrangement of a bottom part in accordance with the present invention.

As shown in FIG. 3, the transfer elements 3 can also be arranged on the wall surface 2 of the bottom part 1, extending in the peripheral direction. Preferably, the transfer elements extend without interruption over the entire periphery, but they can basically also be subdivided into individual sections by corresponding interspaces. It is also possible to combine axial transfer elements and elements extending in the peripheral direction, and different shapes, e.g. zig-zag-shaped, helically shaped, or the like, are also possible. The rim 4 is here likewise flared and thus fashioned or constructed as an additional transfer element.

Figure 4:
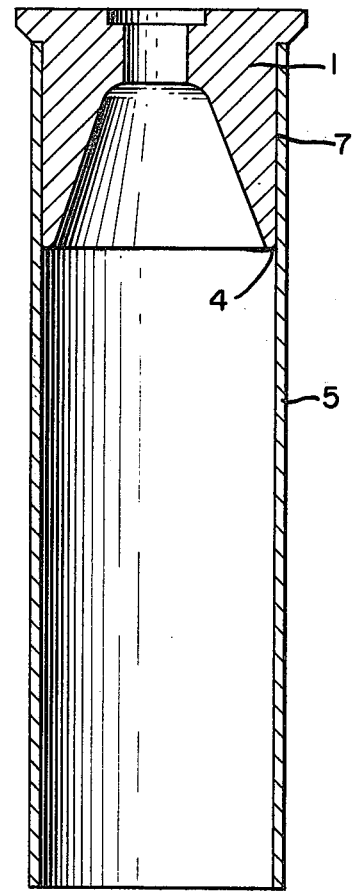
FIG. 4 shows a welded-together shot cartridge case.

FIG. 4 shows the shot cartridge case welded by the ultrasonic method with the welding or bonding zone 7 between the bottom part 1 and the case 5. The transfer elements 3 have been spread or fluxed in the welding zone 7 so that the bottom part 1 and the case 5 are welded together practically along their entire cylindrical contact area. This shot cartridge case is utilized as a fully plastic shot cartridge case without an additional external metallic bottom cap.

Figure 5A:
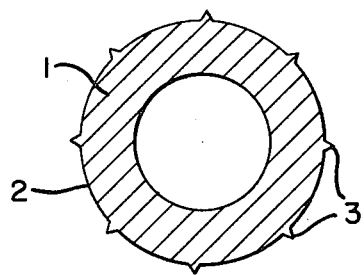
FIGS. 5a and 5b show a bottom part before and after the welding step, respectively in a cross-sectional view.

The bottom part 1 shown in FIG. 5a has on its wall surface 2 likewise eight web-shaped transfer elements 3 extending in the axial direction and reaching across approximately two-thirds of the height of the bottom part 1. Instead of the triangular cross-sectional shape illustrated, the transfer elements 3 can also be ridge-shaped, for example, or they can also be fashioned merely as a projecting edge between two wall surface sections of a mutually different inclination. The diameter of the circular-cylindrical wall surface 2 is slightly larger than the inner diameter of the circular-cylindrical case, so that the bottom part 1 can be inserted in the case with a slight press-fit.

Figure 5B:
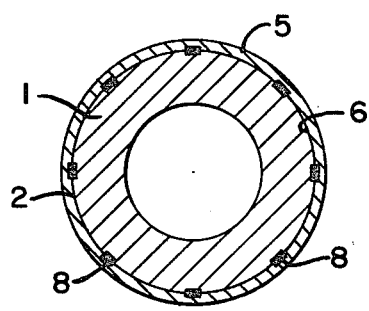

As shown in FIG. 5b, the transfer elements after the welding step have run so that they extend over a somewhat larger portion of the periphery of the wall surface 2, as indicated by the thick lines marking the welding zones 8. The case 5 contact, with its inner wall surface 6, the wall surface 2 of the bottom part 1.

Figure 6:
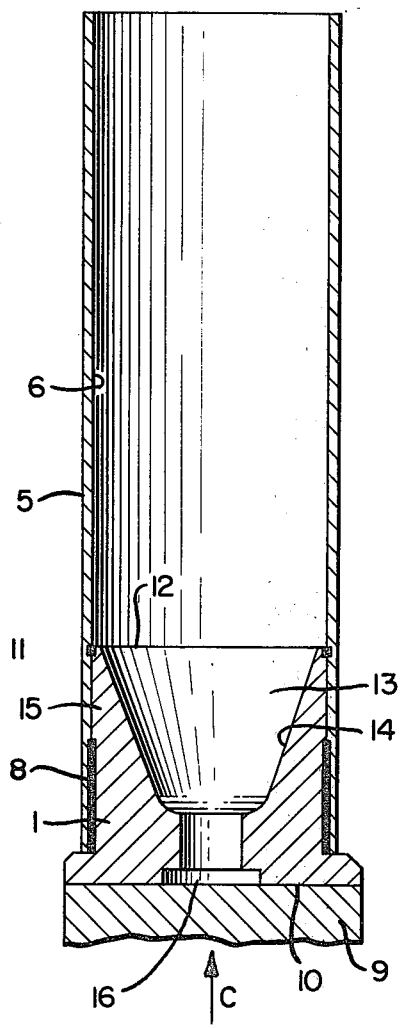
FIG. 6 shows another welded-together shot cartridge case in a longitudinal section.

FIG. 6 shows the cartridge case at the end of the welding step, wherein a schematically indicated "Sonotrode" 9 of the welding unit is still pressed, according to arrow C, against the rear end face 10 of the bottom part 1. In accordance with the process of the present invention, only a single "Sonotrode" 9 is required, making it possible to treat the bottom part 1 with ultrasound or ultrasonic energy in an extremely uniform manner. In general, it is advantageous for the welding step to press the case 5 additionally from the outside radially against the bottom part 1 by means of a contact pressure tool, not shown. The bottom part 1 and the case 5 are joined in the zone of the axial welding areas 8. Additionally, a welding together in the peripheral direction in the zone of the forward rim 11 of the bottom part 1 is provided, but this can be dispensed with if the gastightness can be attained after all by the obturation, due to the effect of the gas pressure, of the forward end of the bottom part 1 against the wall of the case. The bottom part 1 has a cup-shaped indentation 13, emanating from its front end 12 with the inside cross section of indentation 13 being reduced in the direction toward the rear end face 10. The wall 14 is fashioned as a conical surface, so that the annular extension 15 of the bottom part 1 becomes increasingly weaker toward the front and finally terminates in the thin edge 11. The indentation 13 is followed toward the rear by the perforation 16 serving for the reception of a primer element, not shown.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A cartridge case comprising an elongated tubular member and a separate bottom part, said separate bottom part being insertable in said elongated tubular member such that at least a portion of the wall surfaces of said bottom part and said tubular member contact one another, at least one of said separate bottom part and said elongated tubular member in the region of the wall surfaces to be contacted being provided with transfer element means, said bottom part being provided with a rear surface extending transversely to the wall surface thereof, said elongated tubular member and said separate bottom part being formed of synthetic resin materials of different density, said transfer element means being responsive to ultrasonic energy for joining said bottom part and said elongated tubular member to form a gas-tight and firm bond therebetween without disadvantageously altering the strength and shape of said bottom part and said elongated tubular member to enable withstanding of the gas pressures occurring within the cartridge case during firing.

2. A cartridge case according to claim 1, wherein said transfer element means provide a weld material responsive to ultrasonic energy for forming a welded joint of said bottom part and said elongated tubular member.

3. A cartridge case according to claim 2, wherein said transfer element means are at least one of web-like, rib-shaped, and ridge-type protrusions on the wall surface of at least one of said tubular member and said separate bottom part.

4. A cartridge case according to claim 2, wherein said elongated tubular member is formed of a synthetic resin.

5. A cartridge case according to claim 4, wherein said separate bottom part is formed of a synthetic resin.

6. A cartridge case according to claim 2, wherein said transfer element means extend at least in an axial direction of said case.

7. A cartridge case according to claim 2, wherein said transfer element means extend in a peripheral direction.

8. A cartridge case according to claim 2, wherein said bottom part is provided at a front rim thereof constructed as a transfer element means.

9. A cartridge case according to claim 2, wherein said bottom part is a substantially cylindrical member, said bottom part having an axial recess emanating from a front end thereof, the inside cross section of said recess being reduced in the direction of the rear end of said bottom part along at least a portion of the axial extent of said recess so as to provide said bottom part with a wall of varying cross section, the joining of said bottom part and said tubular member being effected at least in the region of said wall of varying cross section.

10. A cartridge case according to claim 9, wherein said elongated tubular member is a cylindrical member having an inside diameter less than the outside diameter of said bottom part so as to provide for an initial press fit of said bottom part within said tubular member.

11. A cartridge case according to claim 2, wherein at least one of said tubular member and said bottom part are formed of a low-pressure polethylene, said low-pressure polyethylene having a density larger than 0.945 g./cm$^3$ and a melt index $I_5$ smaller than 2 g. per 10 minutes.

12. A cartridge case according to claim 11, wherein said bottom part is formed from a low-pressure polyethylene having a density greater than the density of the tubular member.

13. A process for the production of a cartridge case comprising the steps of forming an elongated tubular member and a separate bottom part, at least one of the tubular member and the bottom part being provided with transfer elements on the wall surface thereof arranged for contact upon insertion of the bottom part into the tubular member, the bottom part being formed with a rear surface extending transversely to the wall surface thereof, inserting the bottom part into the tubular member, and applying ultrasonic energy only to the rear surface of the bottom part in the longitudinal direction of the tubular member for causing the transfer elements to form a welded, gas-tight joint between the bottom part and the tubular member at least in the region of the transfer elements without disadvantageously altering the strength and shape of the bottom part and tubular member to enable withstanding of the gas pressures occurring within the cartridge case during firing.

14. A process according to claim 13, wherein the joined bottom part and tubular member form a shot cartridge case.

15. A process according to claim 13, wherein the step of forming includes forming the transfer elements on at least one of the outer wall surfaces of the bottom part and the inner wall surface of the tubular member as at least one of web-like, rib-shaped, and ridge-type protrusions.

16. A process according to claim 15, wherein the bottom part is provided with a rear end face disposed in the region of an end of the tubular member after insertion of the bottom part in the tubular member, and applying ultrasonic energy from the outside to the rear end face of the bottom part.

17. A process according to claim 15, wherein the transfer elements are formed of a weld material responsive to the ultrasonic energy applied thereto.

18. A process according to claim 15, wherein the welding takes place in a region of a substantially cylindrical surface recess emanating from the front end thereof and having an inside cross section which is reduced in the direction toward the rear so that the wall of the bottom part has a varying cross section along at least a portion thereof, the welding being effected at least in the region of the wall of varying cross section.

19. A process according to claim 15, wherein the step of forming includes forming the transfer elements to extend in at least one of the axial and peripheral directions of the cartridge case.

20. A process according to claim 15, wherein the step of forming includes forming the transfer elements on the bottom part to extend at least in the peripheral direction.

21. A process according to claim 15, wherein the step of forming includes forming the front rim of the bottom part as a transfer element.

22. A process according to claim 15, wherein the step of forming includes forming the tubular member from a synthetic resin.

23. A process according to claim 15, wherein the step of forming includes forming at least one of the tubular members and the bottom part of a low-pressure polyethylene.

24. A process according to claim 23, wherein the low-pressure polyetylene has a density larger than 0.945 g./cm$^3$ and a melt index $I_5$ smaller than 2 g. per 10 minutes.

25. A process according to claim 24, wherein the step of forming includes forming the bottom part from a low-pressure polyethylene having a density greater than the density of the tubular member.

26. A cartridge case according to claim 1, wherein said bottom part is only partially insertable within said tubular member with said tubular member extending only partially over said bottom part.

27. A cartridge case according to claim 1, wherein said transfer element means includes a plurality of transfer elements spaced from the bottom surface of said bottom part.

28. A process according to claim 13, wherein the step of inserting includes inserting the bottom part only partially into the tubular member such that the tubular member extends only partially over the bottom part.

29. A process according to claim 13, wherein the step of forming includes forming the transfer elements at a position spaced from the rear end face of the bottom part.

30. A process according to claim 13, wherein the step of forming includes forming the bottom part and the tubular member of synthetic resin materials of different density.

* * * * *